Patented July 12, 1938

2,123,575

UNITED STATES PATENT OFFICE 2,123,575

HARD COMPOSITIONS OF MATTER

Philip M. McKenna, Latrobe, Pa.

No Drawing. Original application September 6, 1935, Serial No. 39,505. Divided and this application February 24, 1937, Serial No. 127,559

10 Claims. (Cl. 75—136)

This application is a division of my pending application for Letters Patent, Serial No. 39,505, Hard compositions of matter, filed September 6, 1935, upon which U. S. Letters Patent No. 2,093,844 issued September 21, 1937, and other divisional applications are filed herewith.

My invention relates to new hard compositions of matter. It has to do, more particularly, with certain novel compositions of matter, notable for their combined strength and hardness, so that they are particularly useful in the construction of tools, dies and other articles of wear-resisting or corrosion-resisting nature, as well as articles which are required to resist deformation or destruction at high temperatures and pressures. In particular, my invention relates to the production of new hard compositions of matter, which are particularly useful as the hard bits or tips including the cutting edges of tools intended for cutting hard materials. These compositions are also particularly adapted to use as wire-drawing dies.

The principal object of my invention is to provide new hard compositions of matter, which have greater combined strength, hardness and resistance to deformation at high temperatures and pressures than any hard compositions of matter heretofore known.

A further object of my invention is to provide new hard compositions of matter, having great combined strength, hardness and resistance to deformation, which are made from macro-crystalline carbides of the metals of the group including tantalum and columbium, which carbides are characterized, not only by their macro-crystalline form, but by a carbon content in true monatomic ratio to the metal present. In other words, it is an object of my invention to produce new hard compositions of matter, having useful characteristics as indicated, which are made from the new macro-crystalline product, instead of the amorphous material heretofore known, for example, as tantalum carbide and consisting of carburized tantalum, in which the carbon is not present in exact monatomic ratio to the tantalum.

It is a further object of my invention to provide novel hard compositions of matter, including tantalum carbide or columbium carbide, together with tungsten metal or molybdenum metal, or both, and a metal or metals of the iron group, in which the proportion of the metals of the group including tungsten and molybdenum to the total non-carbide ingredients of the composition is substantially higher than has been possible heretofore without sacrificing strength. This is an important feature, because an increased proportion of tungsten or molybdenum, or both, imparts to the hard compositions of matter the property of resisting deformation, especially at high temperatures, but, heretofore, it has not been possible to include as much tungsten or molybdenum as was desired, because of the deleterious effect of the amorphous tantalum carbide or amorphous columbium carbide upon the strength of the resulting composition.

Further objects, and objects relating to details and economies of production and operation, will definitely appear from the detailed description to follow. In one instance, I accomplish the objects of my invention by the devices and means set forth in the following specification. My invention is clearly defined and pointed out in the appended claims.

Hard compositions of matter have been known, heretofore, which consisted of an amorphous material, called "tantalum carbide", together with certain proportions of a metal or metals of the group including tungsten and molybdenum, and a metal or metals of the group including iron, cobalt and nickel. The best of these hard compositions of matter was composed as follows: Amorphous tantalum carbide, 78 per cent, nickel, 10.2 per cent, tungsten, 11.8 per cent. This material was made by comminuting the amorphous tantalum carbide and metallic tungsten in a ball mill, using nickel balls, in a bath of naphtha, until the mixture contained the tantalum carbide, tungsten and nickel in the desired degree of fineness and in the required proportions above given. The naphtha was then removed entirely by heating in a partial vacuum at a red heat. A piece was then formed from this dried powder of the desired shape and that piece heated in an electric furnace, under a partial vacuum, corresponding approximately to a pressure of from 70 to 80 microns of mercury, for forty minutes. As the result of this treatment, a hard composition of matter was formed having a Rockwell "A" hardness of 86.5. The strength of the piece thus formed is indicated by the fact that the piece, having a thickness of .200 inch and a width of .375 inch, resting on supports 11/16 of an inch apart, when pressed in the middle with a one centimeter Brinell ball, broke under a load of 1980 kilograms.

Another example of similar hard compositions of matter, heretofore known, is one which comprised 80 per cent amorphous tantalum carbide, 8 per cent nickel and 12 per cent tungsten. This composition had a Rockwell "A" hardness of 87.75 and broke, under the same conditions as specified above, at a load of 1500 kilograms. These two hard compositions of matter, just described, represent what I believe to be the most desirable hard compositions of this type heretofore made, known or used.

These compositions were made from a material which was called "tantalum carbide" but in which the carbon was not present in exact monatomic ratio to the tantalum. This material was amorphous in character, in that it did not present crystalline form to the unaided human eye. For the purposes of this specification I define "macro-crystalline" as having particles which average greater than .01 millimeter in largest cross section dimension and "amorphous" as having particles which average less than .01 millimeter in largest cross section dimension. I understand that there is another sense, in which all solid bodies may be described as crystalline, and may be shown to have ordered atomic arrangement by X-ray methods, or to have crystalline form which may be seen under the microscope, but I do not use the term in this sense, in this specification.

It will be observed that, in the two compositions above-mentioned, the nickel and tungsten together constitute 22 per cent and 20 per cent, respectively, of the composition, and that the tungsten constitutes 53.6 per cent and 60 per cent, respectively, of the ingredients of the composition other than the tantalum carbide. I had believed it desirable, if possible, to increase the proportion of tungsten in the non-carbide ingredients of the composition, but I had found that this was not feasible, heretofore, because a further increase in the proportion of tungsten resulted in a decrease in the strength of the composition, which was undesirable, as the piece would break or chip when used as a metal cutting tool. Thus, although a higher percentage of tungsten is desirable, in order to give the composition increased resistance to deformation, especially at high temperatures, this increased proportion of tungsten could not be obtained, heretofore, without an accompanying decrease in the strength of the composition.

Hard compositions of matter have been proposed, heretofore, including columbium carbide, of the amorphous type in which the carbon is not present in true monatomic ratio to the columbium, together with certain proportions of tungsten and cobalt, but such hard compositions were lacking in practical value, because of the weakness of the material.

It has also been proposed, heretofore, to make hard compositions of matter from a mixture of amorphous tantalum carbide and amorphous columbium carbide, the particles of which were united into a cohesive mass by a mixture of metallic iron and molybdenum. Although such compositions were hard, they were lacking in strength as they would break under a load which was only about one-third of the breaking load of the amorphous tantalum carbide composition heretofore referred to.

In general, my invention consists of novel hard compositions of matter made from a macro-crystalline carbide of the metals of the group including tantalum and columbium, containing carbon in true monatomic ratio to the metal or metals present. The macro-crystalline carbide forming the starting ingredient for the new composition is comminuted, in a non-oxidizing bath, as by a ball mill, for such length of time as needed to reduce the crystals to the desired degree of fineness and to incorporate in the mixture the desired proportions of a metal or metals of the group including tungsten and molybdenum, and of a metal or metals of the iron group. The powdered mixture thus formed after drying off some of the naphtha is pressed to the shape of the piece to be made, the linear dimensions, however, being from 15 to 25 per cent greater than those of the ultimate piece, depending upon the shrinkage which takes place in the process, and the piece thus shaped is heated, under a partial vacuum, in an electric furnace, for about forty minutes, at a temperature of about 1430° C. The heating should require about two hours in all, one hour and twenty minutes being consumed in gradually raising the furnace to the ultimate temperature and removing the gas and vapors, and the furnace being maintained at the ultimate temperature for about forty minutes. As a result of this treatment, the shaped piece shrinks into a cohesive bit of like shape, but smaller dimensions, and it is believed that the metal or metals of the group including tungsten and molybdenum, and the metal or metals of the iron group, included in the composition, function to unite the grains of carbide into a cohesive mass. As will be shown hereinafter, the resulting composition has a hardness equal to that of the compositions heretofore referred to, with a strength and resistance to deformation, especially at high temperatures, which exceeds that of said compositions.

The macro-crystalline carbides which I contemplate using in my present invention, and the method of making such carbides are fully described in my pending application for United States Letters Patent, Serial No. 31,521, filed July 15, 1935, entitled, "Carbides of tantalum and like metals and method of producing the same", to which cross-reference is hereby made.

The invention of the present application contemplates novel hard compositions of matter embodying a macro-crystalline simple carbide, that is, either tantalum carbide or columbium carbide.

My application, Serial No. 39,505, U. S. 2,093,844, of which this application is a division, is directed to compositions embodying multi-carbides in which the major constituent is tantalum carbide and the minor constituent is formed by carbides of a plurality of metals of the group consisting of columbium, titanium and zirconium.

Two other divisional applications of such application, Serial No. 39,505, are filed herewith, one being directed to hard compositions embodying multi-carbides in which the major constituent is tantalum carbide or columbium carbide and the minor constituent is formed by a carbide or carbides of a metal or metals of the group consisting of tantalum, columbium, titanium and zirconium. The other of such divisional applications is directed to compositions of matter embodying multi-carbides of metals of the group consisting of tantalum, columbium, titanium and zirconium in which the major constituent is columbium carbide.

The following are specific examples of new compositions of matter, made in accordance with my invention, from macro-crystalline carbides of the character described in my pending application for United States Letters Patent, Serial No. 31,521. It is necessary, in forming hard compositions of matter from these carbides to provide other metals, which I believe perform the function of uniting the grains of carbide to form a cohesive mass and forming a matrix in which the grains of the hard carbide are embedded. These metals forming the matrix may comprise one or more of the metals of the group including tungsten and molybdenum, and one or more of the metals of the iron group. Small quantities of manganese, beryllium and aluminum may also, at times, be present with advantageous results. In general, I have found that a combination of tungsten and nickel serves, in most circumstances, to form the sort of matrix desired.

I have found that a very satisfactory hard composition of matter may be formed from macro-crystalline TaC, W and Ni, as follows: The TaC may constitute from 55 to 82 per cent of the composition, W, from 10 to 40 per cent, and Ni, from 5 to 15 per cent. The range of proportions which I prefer is TaC, from 70 to 82 per cent, W, from 11 to 38 per cent, and Ni, from 5 to 12 per cent. The following are the specific proportions of the ingredients in two specimens of this composition, that I have made and found useful:

|  | TaC | W | Ni |
|---|---|---|---|
|  | Percent | Percent | Percent |
| Spec. A | 74.6 | 18.0 | 7.4 |
| Spec. B | 78 | 11.2 | 10.8 |

In each of these specimens, the tantalum carbide used as the starting material was macro-crystalline and had a carbon content in true monatomic ratio to the tantalum present and, in that respect, distinguishes from the amorphous material heretofore known as tantalum carbide. The specimens, above mentioned, were subjected to tests to determine their hardness, strength and resistance to deformation, especially at high temperatures. Specimen A had a Rockwell "A" hardness of 89.8 and a breaking strength of 1720 kilograms, determined in the same way as with the prior compositions hereinbefore mentioned. Lathe tests showed that this composition of matter suffered less deformation, at the high temperatures resulting from the cutting action, than the prior compositions. In other words, this new hard composition of matter, specimen A, did not show a tendency to "mushroom" under conditions which would cause the prior compositions to do so. Tests upon specimen B, which, in proportion of ingredients, was about the same as one of the prior compositions referred to, differing therefrom in that it is made from macro-crystalline tantalum carbide instead of amorphous material, showed that it had a Rockwell "A" hardness of 87.62 and a breaking point of 2320 kilograms.

Comparison with the prior compositions shows that specimen A was harder than the prior composition containing 78 per cent amorphous tantalum carbide and not quite so strong, having a breaking strength of 1720 kilograms, as compared with 1980 kilograms. This specimen did, however, exhibit increased resistance to deformation at the cutting temperature. Specimen A was about as hard as the prior composition containing 80 per cent amorphous tantalum carbide and stronger, having a breaking point of 1720 kilograms, as compared with 1500 kilograms. Specimen B, which contained 78 per cent macro-crystalline tantalum carbide, was harder than the corresponding prior composition and about as hard as the prior composition containing 80 per cent amorphous tantalum carbide. It was stronger than either of these prior compositions, having a breaking strength of 2320 kilograms as compared with 1980 kilograms and 1500 kilograms, respectively. It appears, therefore, that these new compositions of matter, made from macro-crystalline TaC, show a better combination of strength, hardness and resistance to deformation than the prior compositions.

The following is a specific example of a new composition of matter, made in accordance with my present invention, using macro-crystalline CbC as the starting material. The macro-crystalline CbC may constitute from 40 to 75 per cent of the composition, W may constitute from 16 to 33 per cent, and Ni, from 10 to 30 per cent. If Mo is substituted for W, it may constitute from 9 to 20 per cent of the composition and, in that case, Ni may constitute from 12 to 33 per cent. I prefer that, where W is used in the composition, the CbC should range from 55 to 65 per cent of the composition, W, from 18 to 22 per cent, and Ni, from 15 to 25 per cent. If, however, Mo be used in place of W, the preferred range of proportions is as follows: CbC, 65 to 72 per cent, Mo, 10 to 14 per cent, and Ni, 18 to 27 per cent. The specific proportions of ingredients used in the making of a specimen of this composition from macro-crystalline CbC is as follows: CbC, 59.4 per cent, W, 20.7 per cent, and Ni, 19.9 per cent. Tests on this specimen showed that it had a Rockwell "A" hardness of 85.2 and a breaking strength of 2030 kilograms. While not quite so hard as prior compositions made of amorphous tantalum carbide, it exceeded these compositions in strength and was far superior in strength and resistance to deformation to any materials heretofore made from amorphous columbium carbide.

The following are the specific proportions of a composition made from macro-crystalline CbC, using molybdenum in place of tungsten: CbC, 73 per cent, Mo, 12 per cent, and Ni, 15 per cent. I believe that this composition also exhibits an excellent combination of strength, hardness and resistance to deformation, especially at high temperatures.

The specific examples of hard compositions of matter, made in accordance with my invention, just given, are illustrative of the new compositions that may be made by the use, as starting materials, of the macro-crystalline carbides of the character described and claimed in my pending application for United States Letters Patent, Serial No. 31,521. It will be understood, of course, that I have not described specifically all of the possible combinations. In general, molybdenum may be substituted for all or a part of the tungsten in any of these compositions, it being understood that, in making such substitution, the proportion of the metal used should be adjusted in the ratio of the atomic weights of tungsten and molybdenum. It will be understood, also, that cobalt may be substituted in whole or in part for the nickel, the proportions being adjusted in the ratio of the atomic weights of cobalt and nickel. Iron may also be substituted for a part of the nickel or cobalt, but the fact that iron, in finely divided form, oxidizes readily, under the conditions present in making these compositions, renders its use in substitution for all or a major proportion of the nickel undesirable.

To express the range of proportions of these compositions, I prefer to state the proportions in molecular and atomic percentages of the ingredients. I prefer that the carbide shall constitute from 68.1 to 55.64 molecular per cent of the composition, that a metal or metals of the group including tungsten and molybdenum should constitute from 15.58 to 17.66 atomic per cent of the composition, and that a metal or metals of the iron group shall constitute from 20.5 to 26.7 atomic per cent of the composition.

I believe that, where the carbide is columbium carbide, compositions having a better combined strength, hardness and resistance to deformation may be produced by substituting molybdenum, in whole or in part, for the tungsten.

The preferred methods for making these new compositions of matter are described in detail and claimed in my application for Letters Patent, Serial No. 66,707, Method of producing hard compositions of matter, upon which U. S. Letters Patent No. 2,093,845 issued September 21, 1937, which likewise is a division of my application for Letters Patent, Serial No. 39,505, Hard compositions of matter, filed September 6, 1935, of which the present application is a division. Consequently, the various steps will not be described in detail herein.

In general, the macro-crystalline carbide is ground and comminuted in a ball mill with metallic tungsten or molybdenum, and with nickel, cobalt or iron, the comminution with the metallic ingredients being continued until the ingredients reach the desired state of fineness and until they are present in the proper proportions. The comminution is preferably carried out in a bath of naphtha, or other suitable material, to prevent oxidation, and it is preferable that the naphtha be previously purified, as by subjecting it to freshly cut surfaces of sodium, to remove oxygen and sulphur-containing compounds.

The finely comminuted particles are partially dried, 1 to 5 per cent of the naphtha being left to protect the powder from oxidation, and the thoroughly mixed particles are then pressed into bits of the desired shape and of a size such as to compensate for the shrinkage of 15 to 25 per cent which will later take place in the heat treatment. The bits are then subjected to heat treatment under a vacuum of from 40 to 7 microns of mercury pressure, in an electric furnace, for about forty minutes at a temperature of from 1400° C. to 1500° C., depending upon the ratio of the metals, the temperature being slowly raised until it reaches this temperature. The vacuum is obtained by a Gaede mercury diffusion pump which draws off and absorbs gases and vapors, including the vapors coming from the hydrocarbon, and the outlet of the mercury diffusion pump is connected to an oil pump. The bits are preferably heated in an electric induction furnace, being placed within a covered graphite crucible.

Whenever I use the term "macro-crystalline" in the appended claims, with reference to a carbide or multi-carbide, I mean a carbide or multi-carbide having particles which average greater than .01 millimeter in largest cross section dimension and produced by the reaction between a metal or metals and carbon in the presence of a menstruum other than the reactants.

I am aware that the products herein disclosed may be varied considerably, without departing from the spirit of my invention, and, therefore, I claim my invention broadly as indicated by the appended claims.

What I claim is:

1. The new hard composition of matter consisting substantially of a matrix formed of an alloy of a metal of the group consisting of tungsten and molybdenum with a metal of the iron group and particles of a comminuted macro-crystalline carbide of a metal of the group consisting of tantalum and columbium embedded in said matrix, said macro-crystalline carbide being characterized by a carbon content in monatomic ratio to the metal or metals present.

2. The new hard composition of matter consisting of particles of comminuted macro-crystalline carbide of a metal of the group consisting of tantalum and columbium, characterized by a carbon content in monatomic ratio to the metal present united by a matrix formed from an alloy of a metal of the group consisting of tungsten and molybdenum with a metal of the iron group.

3. The new hard composition of matter consisting of from 55.64 to 68.1 molecular per cent of a comminuted macro-crystalline carbide of a metal of the group consisting of tantalum and columbium, in which the carbon content is in monatomic ratio to the metal present, from 15.58 to 17.66 atomic per cent of a metal of the group consisting of tungsten and molybdenum, and from 20.5 to 26.7 atomic per cent of a metal of the iron group.

4. A new hard composition of matter consisting substantially of particles of a comminuted macro-crystalline tantalum carbide, in which the carbon content is in monatomic ratio to the tantalum, embedded in a matrix constituted by an alloy of a metal of the group consisting of tungsten and molybdenum with a metal of the iron group.

5. A new hard composition of matter consisting substantially of from 70 to 82 per cent of a comminuted macro-crystalline tantalum carbide, in which the carbon content is in monatomic ratio to the tantalum, from 11 to 38 per cent tungsten, and from 5 to 12 per cent nickel.

6. A new hard composition of matter consisting substantially of 74.6 per cent of a comminuted macro-crystalline tantalum carbide, in which the carbon content is in monatomic ratio to the tantalum, 18 per cent tungsten and 7.4 per cent nickel.

7. The new hard composition of matter consisting substantially of 78 per cent of a comminuted macro-crystalline tantalum carbide, in which the carbon content is in monatomic ratio to the tantalum, 11.2 per cent tungsten, and 10.8 per cent nickel.

8. The new hard composition of matter consisting substantially of particles of comminuted macro-crystalline columbium carbide, in which the carbon content is in monatomic ratio to the columbium, embedded in a matrix constituted by an alloy of a metal of the group consisting of tungsten and molybdenum with a metal of the iron group.

9. A new hard composition of matter consisting substantially of from 55 to 65 per cent of a comminuted macro-crystalline columbium carbide, in which the carbon content is in monatomic ratio to the columbium, from 18 to 22 per cent tungsten, and from 15 to 25 per cent nickel.

10. A new hard composition of matter consisting substantially of 60 per cent of a comminuted macro-crystalline columbium carbide, in which the carbon content is in monatomic ratio to the columbium, 20 per cent tungsten and 20 per cent nickel.

PHILIP M. McKENNA.